W. A. RAYER & W. S LINCOLN,

Assignors, by mesne assignments, to RAYER & LINCOLN SEAMING MACHINE CO.

Sewing-Machine.

No. 9,176. Reissued April 27, 1880.

WITNESSES.

L. F. Connor.

V. D. Dearborn.

INVENTORS.

William A. Rayer.

William S. Lincoln by Crosby & Gregory, Atty.

N. PETERS, PHOTO-LITHOGRAPHER, WASHINGTON, D. C.

UNITED STATES PATENT OFFICE.

WILLIAM A. RAYER AND WILLIAM S. LINCOLN, OF BOSTON, MASSACHUSETTS, ASSIGNORS, BY MESNE ASSIGNMENTS, TO RAYER & LINCOLN SEAMING MACHINE COMPANY.

SEWING-MACHINE.

SPECIFICATION forming part of Reissued Letters Patent No. 9,176, dated April 27, 1880.

Original No. 108,827, dated November 1, 1870. Application for reissue filed March 1, 1880.

*To all whom it may concern:*

Be it known that we, WILLIAM ANDERSON RAYER and WILLIAM STILLWELL LINCOLN, of Boston, in the county of Suffolk and State of Massachusetts, have invented an Improvement in Sewing-Machines especially adapted to sew together the ends of piece goods in factories; and we hereby declare that the following specification, in connection with the accompanying drawings, will enable others skilled in the art to make and use the same.

Figure 1:
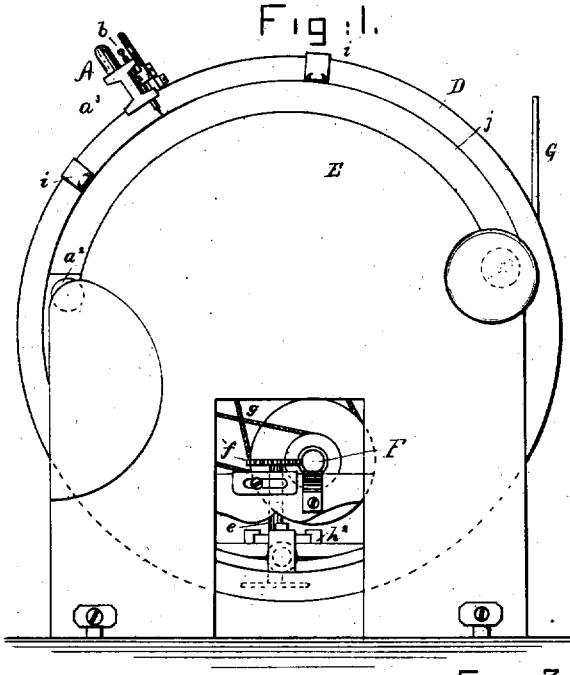
Figure 2:
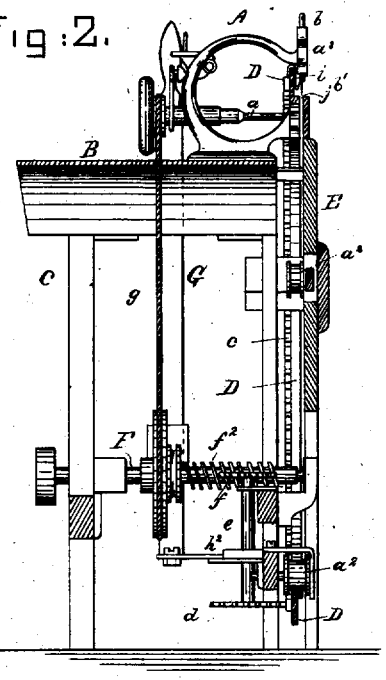
Figure 3:
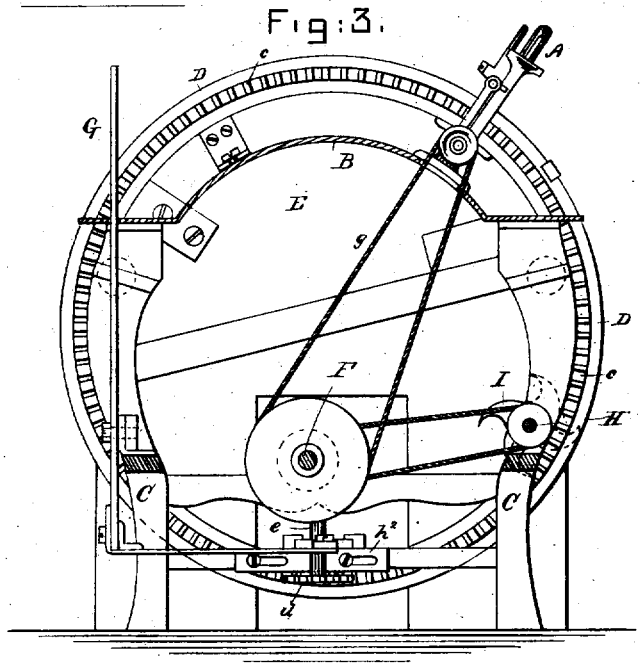

Figure 1 represents, in front elevation, our improved apparatus for sewing piece goods; Fig. 2, a vertical transverse section of the same, and Fig. 3 a rear elevation thereof.

In the drawings, A represents the well-known Willcox & Gibbs sewing-machine, *a* marking the usual rotatable hook-shaft, and *b* the usual needle bar, with needle *b'* attached. The said machine stands on a table, B, at the top of frame C.

The rotatable annular feeding-plate D, of that particular class usually and properly denominated as a "baster-plate," because it has sharp points to enter and positively carry the fabric, is supported in vertical position by the rollers $a^2$ on studs mounted in the frame C. This plate D, herein located at the rear of the head $a^3$, or that part of the machine in which the usual needle-bar and presser-bar work, has connected with it a side-toothed gear, *c*, which, engaged by the toothed wheel *d*, rotates the said annular feeding or baster plate, causing it, by its sharp-pointed hooks *i*, to carry the fabric along under the needle continuously. These hooks *i* may be moved toward or from each other on the annular feeding-plate, according to the width of the fabric to be sewed, said fabric entered by the said hooks resting on the shoulder *j*, that projects from the annular plate.

The gear-wheel *d* is secured to the shaft *e*, upon which is a toothed wheel, *f*, engaged and set in motion by the worm-gear $f^2$, or otherwise, from the driving-shaft F, hung in the frame C, and which may also, by a belt, *g*, or otherwise, impart the required motion to the sewing-machine.

The shaft *e* is held in a sliding frame, $h^2$, which can be moved by means of the lever G, to throw the gear *d* into or out of mesh with the teeth of the annular feeding-plate D. The shield E in front covers all but the upper part of the said plate D.

While the sewing-machine A is in operation, the plate D is revolved with the requisite velocity to carry the fabric along continuously at the desired speed, and when two pieces have been nearly connected two more pieces can be hung upon the hooks as they are in succession brought into position, and so the sewing need not be interrupted.

The winged wheel, I attached to shaft H, serves to throw the fabric from the hooks *i* after having been sewed, thus avoiding all liability of carrying the fabric down under the shield E.

In sewing-machines containing the usual intermittingly-rotated wheel-feed, variations in speed affect, through momentum, the length of stitch, and the power required to run such a feed, and wear of machinery, and the cost of mechanism are all greater than in this our plan, wherein the feed is continuous, which always insures an equal length of stitch and a substantially uniform expenditure of power.

With an annular feeding-plate, as described, provided with points or hooks to penetrate and hold the fabric as it is moved along under the needle, we have combined the well known Willcox & Gibbs class of machine, the hook or looper of which, as it is well known, rotates continuously in one direction, and may be run at the highest speed.

We claim—

1. The within-described apparatus for sewing together the ends of pieces of fabric for factory use, it consisting, essentially, of the stitch-forming mechanism shown and described, the rotatable annular feeding-wheel provided with hooks to penetrate, carry, and present the fabric positively to the action of the said stitch-forming mechanism, and means to operate the said feeding-wheel continuously, as described.

2. The annular baster-plate or feeding-wheel, provided with teeth *c*, the shaft *e*, having a pinion at each end, and mechanism by which said shaft may be slid into and out of contact with the said feeding-wheel, combined with the driving-shaft F, having the worm *f* thereon, all arranged as and for the purposes described.

3. The combination, with stitching mechanism substantially such as described, of the continuously-revolving annular baster plate or wheel to feed the fabric, and mechanism to continuously revolve the baster-wheel, substantially as described.

WILLIAM ANDERSON RAYER.
WILLIAM STILLWELL LINCOLN.

Witnesses:
BENJ. W. BARKER,
EDWARD L. BROOKS.